(12) United States Patent  
Feldman

(10) Patent No.: US 6,491,267 B1  
(45) Date of Patent: Dec. 10, 2002

(54) BLOW DRYER HOLDER

(76) Inventor: Linda Feldman, 43 Jayson Ave., Great Neck, NY (US) 11021

( * ) Notice: Subject to any disclaimer, the term of this patent is extended or adjusted under 35 U.S.C. 154(b) by 0 days.

(21) Appl. No.: 09/648,889

(22) Filed: Aug. 25, 2000

(51) Int. Cl.[7] .............................................. F16M 11/04
(52) U.S. Cl. ................................................... 248/176.1
(58) Field of Search ......................... 248/126.1, 122.1, 248/125.1, 121, 101, 157; 34/90, 97

(56) References Cited

U.S. PATENT DOCUMENTS

| | | | | |
|---|---|---|---|---|
| 3,365,761 A | * | 1/1968 | Kalvig | 248/113 |
| 4,597,496 A | * | 7/1986 | Kaplan | 211/70.6 |
| 4,856,220 A | * | 8/1989 | Oak et al. | 248/314 X |
| 4,905,951 A | * | 3/1990 | Putness | 248/113 |
| 5,613,305 A | * | 3/1997 | Narrin | 34/90 |
| 5,636,815 A | * | 6/1997 | Wilson | 248/125.3 X |
| 5,737,847 A | * | 4/1998 | Britton | 34/97 |
| 5,832,624 A | * | 11/1998 | Narrin | 34/97 |
| 5,842,670 A | * | 12/1998 | Nigoghosian | 248/160 |
| 5,937,537 A | * | 8/1999 | Miller | 248/160 X |
| 5,970,622 A | * | 10/1999 | Bahman | 34/97 |
| D417,751 S | * | 12/1999 | Simento | D28/73 |
| 6,044,574 A | * | 4/2000 | Haghkhah et al. | 248/229.15 X |
| 6,199,805 B1 | * | 3/2001 | Pena | 248/125.8 |
| 6,205,679 B1 | * | 3/2001 | Rodway et al. | 34/90 X |
| 2001/0011695 A1 | * | 8/2001 | Hill et al. | 248/346.2 |

* cited by examiner

Primary Examiner—Daniel P. Stodola  
Assistant Examiner—Erica B. Harris  
(74) Attorney, Agent, or Firm—Hedman & Costigan, P.C.

(57) ABSTRACT

A blow dryer holder for holding a hand held blow dryer having a stand as well as an opening for receiving at least a portion of the blow dryer and resilient fingers and a rest having a plurality of rest locations for a terminal end of the blow dryer handle. The stand preferably includes a base and an extension for raising the height of the blow dryer.

5 Claims, 5 Drawing Sheets

BLOW DRYER HOLDER

FIELD OF THE INVENTION

The present invention relates to the field of beauty device accessories, and more particularly to the area of holders for blow dryers during use.

BACKGROUND OF THE INVENTION

Early hair dryers were large fixed appliances having a dome shaped hood under which a user would place their head. These devices, however, were cumbersome and could not be easily moved.

In an attempt to provide mobility, manufacturers devised "portable" hair dryers. These, although moveable, were still very bulky and difficult to transport.

More recently, hand held blow dryers were introduced. Hand held blow dryers are generally much smaller and easier to pack and carry. The user typically holds such a blow dryer in one hand while using the other hand to run through their hair or hold a brush or other styling instrument. However, since one hand must be used to hold the blow dryer, the user only has one hand available to style their hair.

It is therefore an object of the present invention to provide a support for a hand held blow dryer during use thereby freeing both hands for the user to style their hair.

SUMMARY OF THE INVENTION

This and other objects are achieved by the present invention directed to a blow dryer holder comprising a stand and means for engaging a blow dryer while the blow dryer is in use. The stand preferably comprises a base for providing stability and an extension for raising the height of the blow dryer or, alternatively, a number of extensions that act as legs to provide stability and raise the height of the blow dryer. The means for engaging the blow dryer preferably includes an opening for accepting either the handle or the nozzle of the blow dryer. A restraint means or mechanism can be used to releasably secure the blow dryer within the means for engaging the blow dryer. Means for fixing the position of the blow dryer is preferred to ensure that the blow dryer is providing the direction of airflow desired by the user and may or may not be associated with the means for engaging the blow dryer.

BRIEF DESCRIPTION OF THE DRAWINGS

The following drawings, in which like reference characters indicate like parts, are intended only to illustrate the preferred embodiments of the invention without limiting the invention in any manner whatsoever.

DETAILED DESCRIPTION OF THE PREFERRED EMBODIMENT

Figure 1:
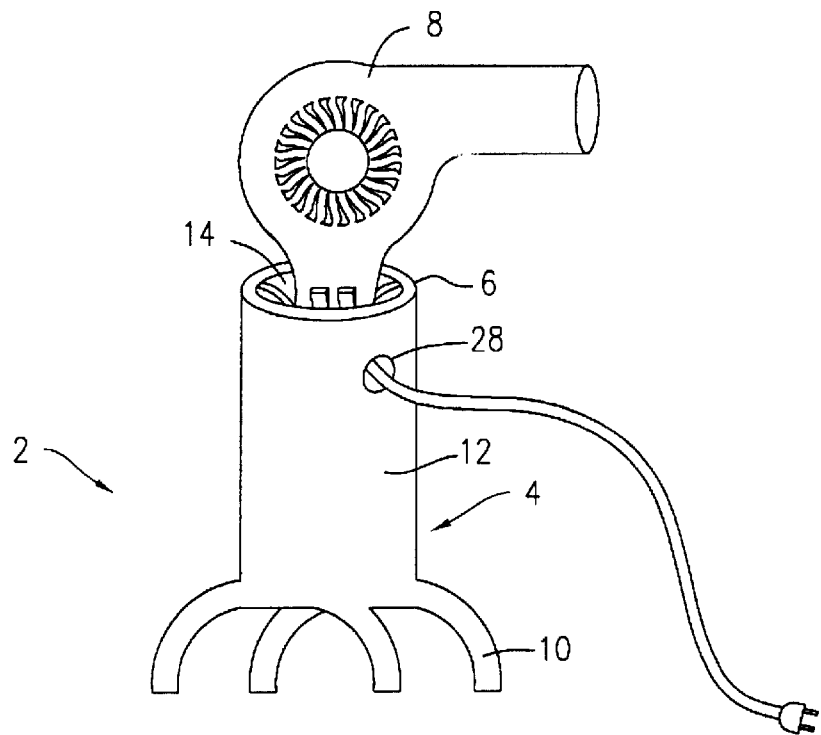
FIG. 1 is a perspective view of a preferred embodiment of the invention with a blow dryer situated therein.
Figure 5:
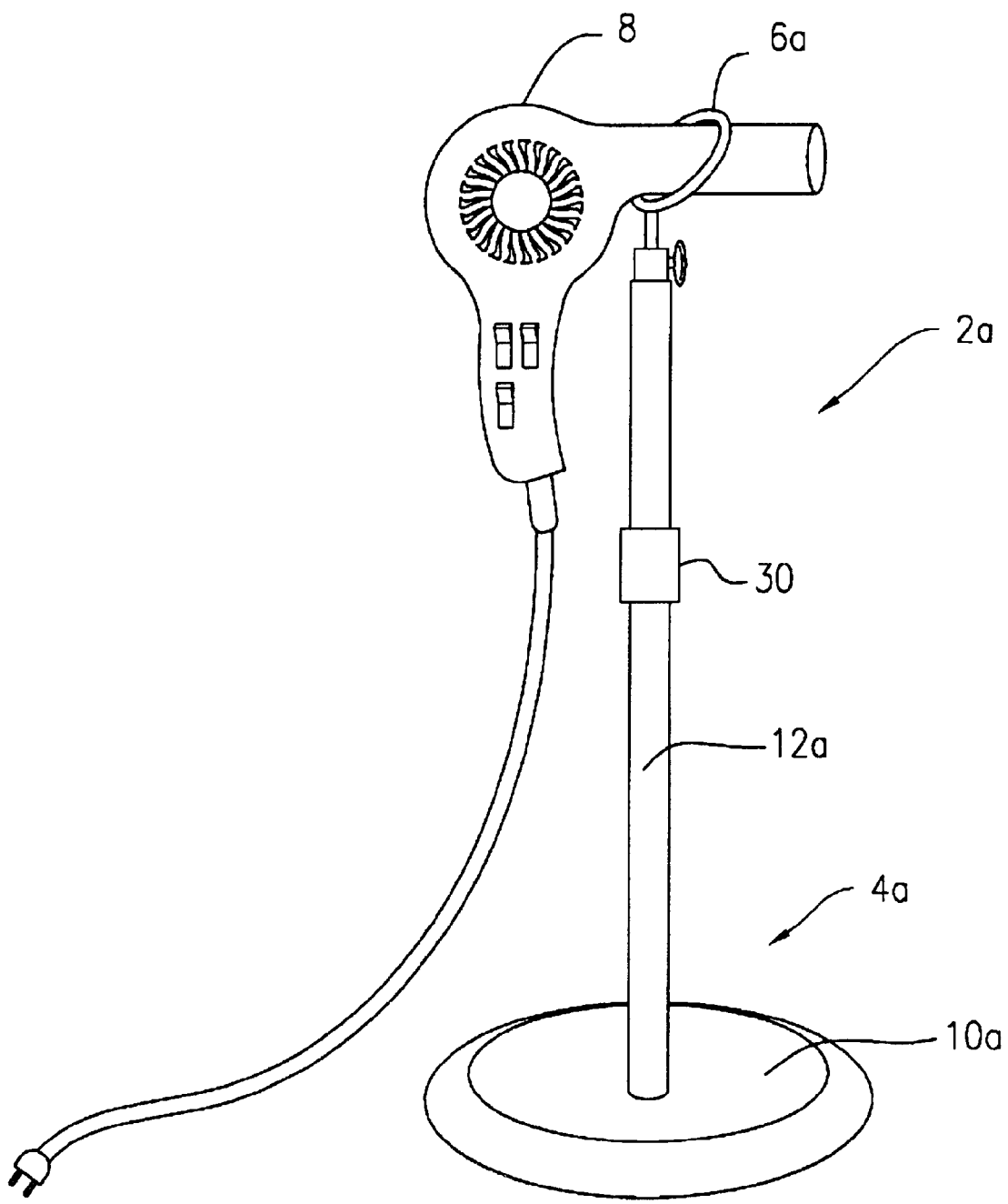
FIG. 5 is a perspective view of an alternative embodiment of the present invention.

As shown in the drawings, and specifically FIGS. 1 and 5, the blow dryer holder 2 of the present invention includes a stand 4 and means 6 for engaging a blow dryer 8. The stand 4 preferably includes a base 10 for providing stability to the holder 2 and an extension 12 for raising the height of the blow dryer 8 off of the base 10.

Figure 2:
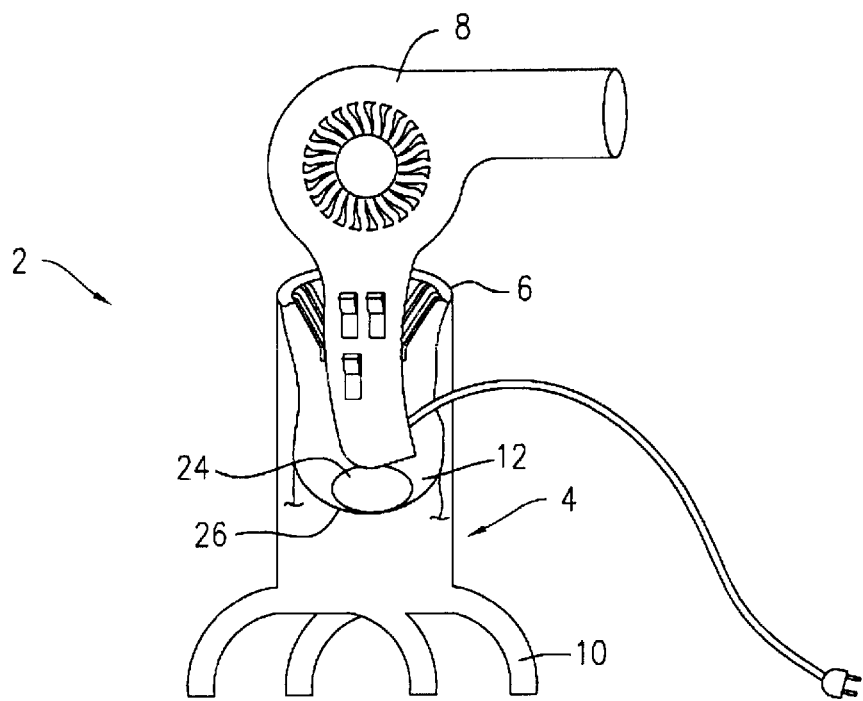
FIG. 2 is a perspective view of the embodiment of FIG 1 in partial cross section.
Figure 3:
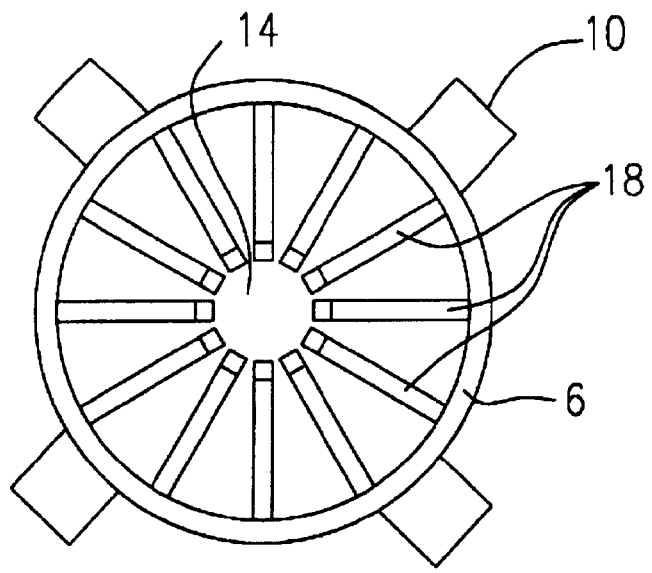
FIG. 3 is a plan view of the embodiment of FIG. 1.
Figure 4:
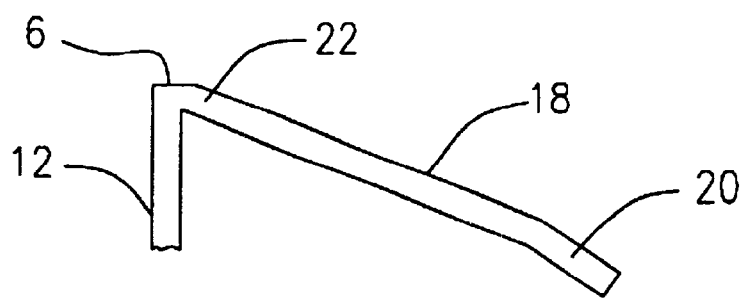
FIG. 4 is a partial cross section showing the living finger of the embodiment of FIG. 1.

The means 6 for engaging the blow dryer 8 preferably comprises an opening 14 through which at least a portion of the hair dryer 8 passes for the blow dryer 8 to be held. As shown in FIGS. 1–3, the opening is adapted to accept the handle of the blow dryer 8. Means for fixing the position of the blow dryer 8 includes a plurality of resilient fingers 18 attached to the means 6 for engaging the blow dryer 8. As best shown in FIGS. 2, 3 and 4, the resilient fingers 18 extend inwardly and downwardly from the perimeter of the means 6 for engaging the blow dryer 8. In its most preferred embodiment, the resilient fingers 18 include a second angled portion 20 to facilitate insertion and removal of the blow dryer 8.

The fingers 18 are preferably made of the same material as the stand 4 and are attached to or formed integrally with the means 6 for engaging the blow dryer 8 to form a living hinge 22. The fingers 18 are adapted to flex in the area of the living hinge 22 when the blow dryer 8 is inserted into or removed from the holder 2, and further when the blow dryer 8 is tilted to one side or the other for the user to obtain the preferred angle of airflow. Additionally, a rest element 24 is provided on or as part of an internal shelf 26 for placement of the end of the handle thereon. It is preferred that the rest element 24 be made of a gel, rice, sand, pellets or similar material so that the handle can be placed virtually anywhere thereon without moving.

Alternatively, the rest element 24 can be a surface on the shelf 26 having a plurality of concave dimples thereon, similar to an egg carton configuration of indented dimples. In such an embodiment, the handle can be rested in one of the dimples to provide a slant on the blow dryer for providing the user preferred angle of airflow.

When the stand 4 shown in FIG. 1 is used, an aperture 28 for the plug of the blow dryer 8 to pass is preferred. Of course, the plug could merely extend up through the opening 14 for engaging the handle of the blow dryer 8 or through the bottom of the stand if the base 10 is open as shown in FIG. 1.

Figure 6:
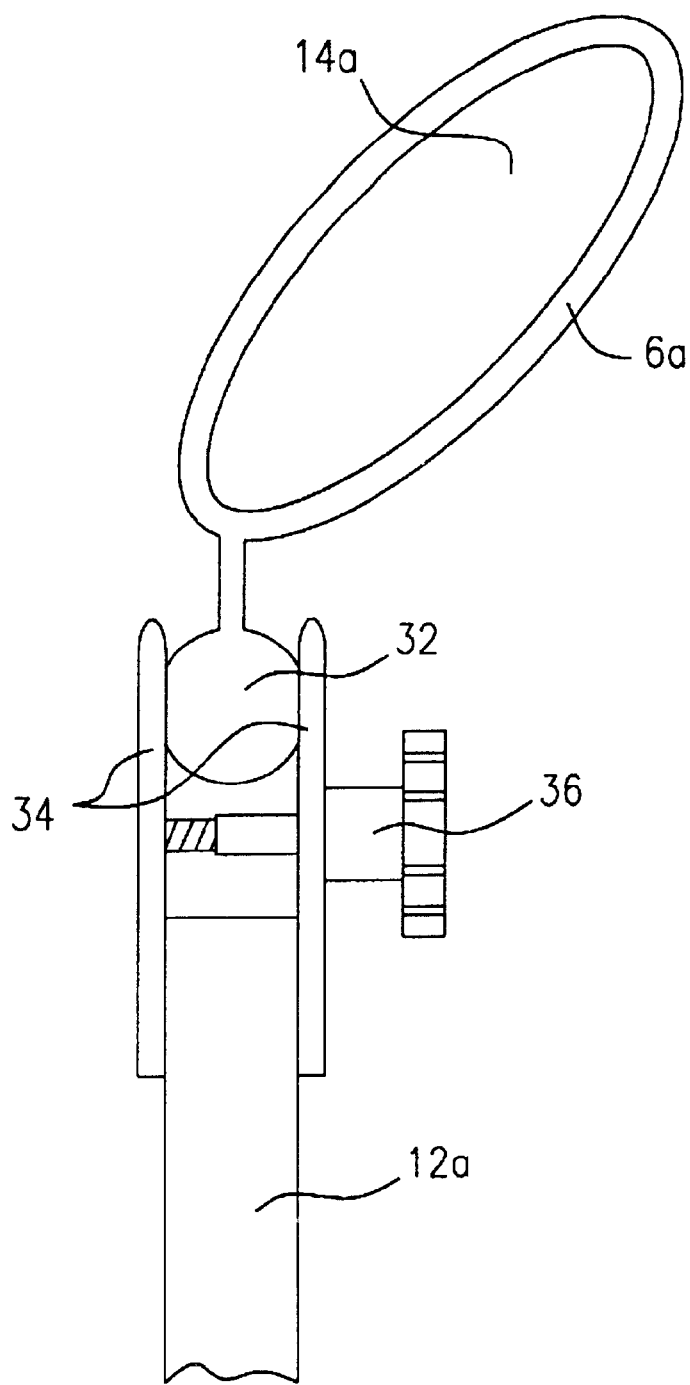
FIG. 6 is a partial perspective view of the embodiment of the present invention shown in FIG. 5.

In the alternative embodiment of FIGS. 5 and 6, the stand 4a has an extension 12a in the form of a pole. The preferred pole 12a includes two pole sections, a wider lower pole section and a thinner upper pole section, with a retention element 30 for fixing the poles in relation to one another. The retention element 30 thereby allows the length of the pole 12a to be adjusted for height.

Such retention element 30 can be any mechanism for fixing variable lengths. These may include a constricting collar as is well known for use on adjustable painter's extension poles, camera stands, music stands and the like, a spring action tab element where one of the pole sections has a plurality of tab receiving apertures for a portion of the tab to pass through, a friction stop which can be brought into contact with the top pole portion through a clamp action, a twist and lock mechanism or any other suitable means for adjustably maintaining the pole portions in fixed relationship, as is known in the art or later developed.

Also, the alternative embodiment of FIGS. 5 and 6 includes means 6a for engaging the blow dryer 8 wherein the opening 14a is adapted to engage the nozzle of the blow dryer 8. The opening 14a is of sufficient size to accept a large nozzle since the means 6a can be tilted to hold the nozzle at the preferred angle of airflow when a smaller nozzle is inserted therethrough. It has been found that an opening 14a of about 3–3½ is suitable for use in this embodiment.

The means for fixing the position of the blow dryer 8 in the embodiment of FIG. 5 is preferably a ball 32 cooperating with the means 6a for engaging the blow dryer 8 which is compressed between cooperating clamp arms 34. This means is commonly found on camera stands, as described in U.S. Pat. No. 4,439,032. In such means, clamp arms 34 are drawn together by a screw member 36. The user can adjust the angle of the means 6a for engaging the blow dryer 8 by loosening the screw member 36 thereby allowing the ball 32 to rotate between the arms 34. When the preferred position is obtained the user tightens the screw member 36 to prohibit rotation of the ball 32.

Once again, any known means for fixing the position of the blow dryer 8 during use can be used, like that often found on camera stands described above or devices providing similar function to rotate the object being held in one or more directions.

Figure 7:
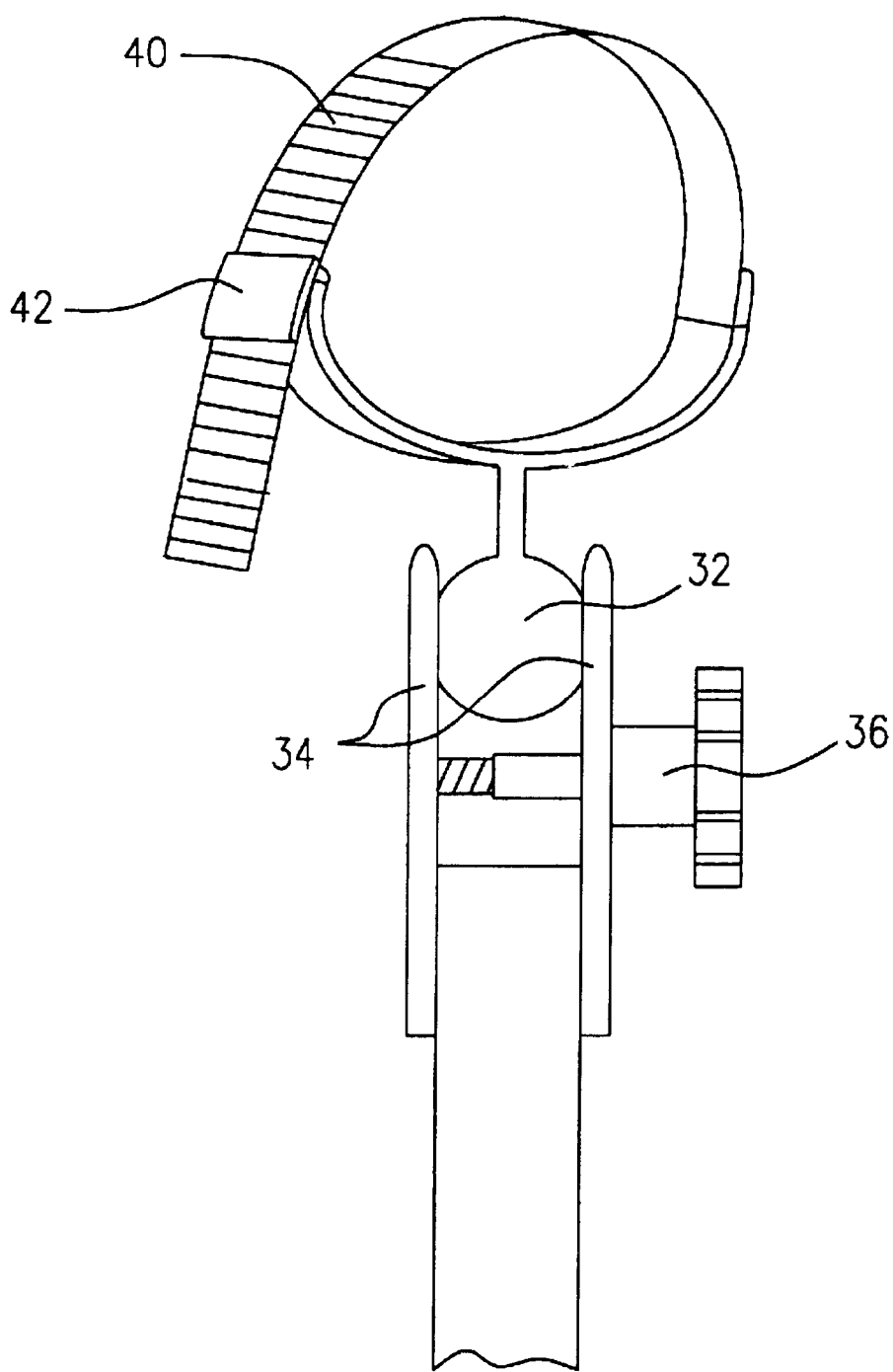
FIG. 7 is a partial perspective view of an alternative embodiment for engaging a blow dryer for use in the present invention.

Alternatively, a strap, belt or clamp can be used to secure the blow dryer 8, as shown in FIG. 7, rather than the solid ring shown in FIGS. 5 and 6. Such strap means may include a belt with snaps, a buckle or catches, or a VELCRO strap, which can be wound around at least a portion of the blow dryer 8, preferably the nozzle, for a snug fit. Similarly, a ratchet type strap 40 and spring action releaseable catch 42, as illustrated in FIG. 7 and commonly used on in-line skates to secure the skate onto a user's foot, can be provided instead of the open ring shown to snugly engage the blow dryer 8.

Of course, variations and modifications can be made to the present invention, the preferred embodiments of which are described above, with obvious elements being substituted for those described. For example, blow dryers can be adapted to include an element that couples with a corresponding element on the stand, such as a threaded receiver, much like cameras, with the means for engaging the blow dryer 8 being a threaded post to be inserted into the threaded receiver for holding the blow dryer 8. All such changes are considered to fall within the spirit and scope of the invention, limited only by the appended claims.

I claim:

1. A blow dryer holder for holding a blow dryer at a user selectable angle during use, said blow dryer having a nozzle and a handle, said holder comprising a stand and means for engaging the blow dryer, said means for engaging the blow dryer comprising an opening for receiving at least a portion of the handle of the blow dryer and means for fixing the position of the blow dryer comprising a plurality of resilient fingers attached about the opening, said resilient fingers extending inwardly and downwardly from the perimeter of the opening and having a second angled portion near the terminal end of the fingers, and a rest member including a plurality of rest locations for a terminal end of the handle of the blow dryer.

2. The blow dryer holder of claim 1 wherein the stand comprises a base and an extension.

3. The blow dryer holder of claim 1 wherein the rest member is taken from the group consisting of a deformable bag containing gel, rice, sand or pellets, and a dimpled surface.

4. The blow dryer holder of claim 1 wherein the resilient fingers are formed integrally with the opening about the perimeter of the opening.

5. The blow dryer holder of claim 1 further comprising an aperture for a plug and/or cord of the blow dryer to pass.

* * * * *

UNITED STATES PATENT AND TRADEMARK OFFICE
CERTIFICATE OF CORRECTION

PATENT NO. : 6,491,267 B1
DATED : December 10, 2002
INVENTOR(S) : Feldman, Linda It is certified that error appears in the above-identified patent and that said Letters Patent is hereby corrected as shown below:

<u>Title page,</u>
Item [75], Inventor, change "Linda Feldman" to -- Linda Sebastian --.

Signed and Sealed this

Tenth Day of June, 2003

JAMES E. ROGAN
*Director of the United States Patent and Trademark Office*